United States Patent
Oesterwind et al.

[11] Patent Number: 6,060,092
[45] Date of Patent: May 9, 2000

[54] COOLING AND $CO_2$-ENRICHMENT OF DRINKING WATER

[75] Inventors: Dieter Oesterwind, Jülich; Rudolf Irmscher, Düren, both of Germany

[73] Assignee: Stadtwerke Düsseldorf AG, Düsseldorf, Germany

[21] Appl. No.: 08/839,518

[22] Filed: Apr. 14, 1997

[30] Foreign Application Priority Data

Apr. 16, 1996 [DE] Germany .................. 196 14 754

[51] Int. Cl.[7] .................. A23L 2/00; B67D 5/00
[52] U.S. Cl. .................. 426/67; 99/275; 222/146.6; 261/DIG. 7; 426/477
[58] Field of Search .................. 426/67, 477, 590; 222/146.6; 99/275; 261/DIG. 7

[56] References Cited

U.S. PATENT DOCUMENTS

| | | | |
|---|---|---|---|
| 3,256,802 | 6/1966 | Karr | 99/275 |
| 3,730,500 | 5/1973 | Richards | 261/DIG. 7 |
| 3,765,318 | 10/1973 | Mazza | 99/275 |
| 5,062,548 | 11/1991 | Hedderick et al. | 261/DIG. 7 |
| 5,353,958 | 10/1994 | Hawkins | 222/146.6 |
| 5,417,147 | 5/1995 | Mason | 261/DIG. 7 |

FOREIGN PATENT DOCUMENTS

| | | |
|---|---|---|
| 0278773 | 8/1988 | European Pat. Off. . |
| 9302277 | 8/1993 | European Pat. Off. . |
| 0682979 | 11/1995 | European Pat. Off. . |
| 3021085 | 12/1981 | Germany . |
| 9420518 | 7/1995 | Germany . |
| 2960876 | 8/1996 | Germany . |
| 3094270 | 8/1978 | Japan . |
| 1095239 | 11/1994 | Switzerland . |
| 674285 | 5/1950 | United Kingdom . |

*Primary Examiner*—George C. Yeung
*Attorney, Agent, or Firm*—Brown & Wood, LLP

[57] ABSTRACT

A method for continuous carbonation and optionally cooling of drinking water which can be carried out in a user-friendly appliance which can be accommodated in any household and provides the consumer with the possibility of dispensing preferably cooled, $CO_2$-containing drinking water by the glass or cupful, is characterised in that in the continuous (in-line) process drinking water taken from the mains supply is carbonated and is optionally cooled; the device comprising a carbonation section for connection to the drinking water supply main and at least one pressure-controlling tap at the end of the dispensing line, and optionally a cooling system.

43 Claims, 4 Drawing Sheets

COOLING AND CO$_2$-ENRICHMENT OF DRINKING WATER

FIELD OF THE INVENTION

The invention relates to a method of cooling and CO$_2$-enrichment of drinking water and to a device for putting the method into practice, in particular for the continuous processing and portionwise dispensing of drinking water.

Whenever "carbonation" is referred to hereinafter, what is meant is the abovementioned CO$_2$-enrichment.

BACKGROUND OF THE INVENTION AND PRIOR ART

Such methods and devices are known in various forms, but all without exception involve discontinuous processing. Moreover most appliances of this kind are unsuitable for home use by the end user, primarily because of the large volumes of the storage and cooling vessels required for the cooling and carbonation.

Thus in International patent application WO 94/05407-A1 a device for preparing and dispensing refreshment beverages is proposed in which drinking water is delivered into a vessel flooded with CO$_2$ in which the water level is detected by sensors and is maintained between a minimum and a maximum value according to the consumption. A circulating pump driven by an electric motor is housed in this intermediate storage vessel and sucks CO$_2$ gas out of the gas blanket present above the store of water and mixes it into the stored water in the vicinity of the pump. Cooling coils are fixed to the outside of the storage tank and form part of the cooling system and serve to form a jacket of ice inside the storage tank on its side walls, the thickness of which is measured and serves as a control variable for the cooling power. Water carbonated and cooled in the storage tank can be withdrawn therefrom.

Apart from the obviously substantial technical outlay and the volume of the apparatus required, which make this apparatus unsuitable for the end user, especially as a household appliance, the known processor also suffers from considerable disadvantages. These are in particular that at the intended dispensing rate the ice jacket used as the cold capacity accumulator melts, and after it has been used up the dispensing temperature can no longer be maintained at the desired low value, and in addition when the ice jacket is present the beverage dispensing temperature lies uncontrollably at temperatures below 4° C.

Furthermore, from Japanese published patent application JP 53-094 270 a process for carbonation and storage of water is known by which water which has preferably been pre-cooled and brought to a desired pressure level is pretreated with CO$_2$ and then led into a first pressure vessel flooded with CO$_2$ and further enriched, and is then collected and stored in a further storage tank, similarly flooded with CO$_2$. This carbonation plant, too, suffers from the disadvantage of being unsuitable for use as a domestic appliance owing to the large number of its components and their size. Moreover in this case several steps are needed for introducing the gas, namely first during the supply of the liquid, then a post-carbonation in a further step in the first vessel pressurised with CO$_2$, and finally in the storage tank. The possibility of direct dispensing of the processed water is not available, since the water must first flow through the storage tank.

In DE 30 21 085-A1 a device for impregnation of water with CO$_2$ is described and illustrated in which the CO$_2$ and the water are brought together under elevated pressure in a vessel containing a cooling coil, the CO$_2$ issuing through pores of a porous body and being taken up by the water as it flows in countercurrent.

In this form of a carbonation apparatus the carbonation apparatus concerned is again one which operates with a vessel flooded with CO$_2$, with the disadvantages explained above. Apart from the fact that such vessels require a large amount of space and are not suitable for end users, particularly households, with this known device, too, it is not possible to change the CO$_2$ content at short notice owing to the liquid buffer that is required.

On the other hand, while carbonation devices which in respect of their dimensions are suitable as domestic appliances for the end user, so-called lance carbonation devices, are certainly available on the market, these are nevertheless rather inconvenient to use when in particular circumstances drinking water has to be carbonated portionwise which, in order to introduce larger amounts of CO$_2$, must in addition be separately cooled, since the solubility falls by about 30%, with an increase in temperature of 10° C.

OBJECT OF THE INVENTION

It is an object of the invention to provide a method which makes it possible to perform continuous carbonation of drinking water and forms the basis of a device which can be accommodated as an easy-to-operate appliance in every household and provides the user with the possibility of drawing off, by the glass or cupful, optionally cooled drinking water having any desired carbon dioxide content.

SUMMARY OF THE INVENTION

This object is achieved by a method of carbonation (CO$_2$-enrichment) of drinking water in which, in a continuous (in-line) process, drinking water taken from the supply mains is carbonated as it is drawn off (tapped), and by a device for practising this method, particularly for portionwise dispensing of drinking water, preferably by the glass or cupful, and at the same time continuously processing it, the device including at least one carbonation section for connection to the drinking water main and a dispensing line with at least one pressure-controlling tap at the end thereof.

The concept underlying the invention—that of a continuous in-line process including the carbonation and cooling (preferably likewise taking place during tapping) of the drinking water being withdrawn from the mains supply, which can then be tapped off, finally processed, in any desired amounts—can be realised in various modifications.

Thus for the cooling either a compression-type cooling plant or a Peltier cooling plant can be used. A particular feature of the invention is the in-line continuous carbonation, which is preferably effected using the injector principle, that is to say, CO$_2$ is not, as in the prior art, injected by means of a lance or mixed in in a pressure vessel, but is sucked up by the cooled drinking water as this passes through the injector at high velocity and is absorbed by the drinking water in the following mixing section—a zone of high turbulence.

Since, as mentioned above, the solubility of CO$_2$ in water is temperature-dependent, if the temperature of the drinking water in the supply mains is low enough cooling during the processing can be omitted or only take place after the carbonation.

The normal pressure in the mains supply is preferably used, at least along part of the processing line, as the delivery pressure, which can then be raised before the injector to produce the desired turbulence in the injector or in the following mixing section to produce the largest possible CO$_2$/water contact surface in order to facilitate the absorption of CO$_2$.

In order to maintain the increased pressure in this region, i.e. from the injector to the tap, both to prevent demixing and also in the interest of optimum carbonation, on the one hand this section is pressure-sealed from the cooling section by suitable means and on the hand it is provided with a pressure-measuring point controlling the pump serving to produce the increased pressure, so that if tapping should cause the pressure to fall below a desired value the pump is switched on to raise the pressure in the said section.

Advantageously a flow quantity controller is provided in the CO$_2$ supply line at the injector or the mixing tube connected in series therewith by which the amount of CO$_2$ supplied to the injector can be adjusted in the desired manner, so that the beverage tapped can be varied from "still" to "sparkling" almost by the glass or cupful.

If the pressure in the drinking water mains supply is high enough the carbonation and optional cooling can also be performed wholly without any increase in pressure, so that a pressurising pump can be omitted. A final possibility is for an increase in pressure only to be undertaken when the drinking water has already been cooled and/or carbonated.

The measures and features in accordance with the invention provide not only an easy-to-understand, user-friendly and compact design for the appliance, but also a modular combination of components which leads to a small appliance for end users which can be adapted and retrofitted as desired to various ways of connection and customer requirements as to cooling temperature, throughput etc. As appears from the explanations given above, the possibility is also provided of arranging the components of the processing line in a sequence other than that described. In particular the pump (when it is needed at all) can be located at any suitable position in the processing line, whereby e.g. the mains pressure can be used as delivery pressure over a portion of the processing line.

The invention will now be explained in more detail with reference to the accompanying drawings, which illustrate preferred embodiments of the invention.

DETAILED DESCRIPTION OF PREFERRED EMBODIMENTS OF THE INVENTION

Figure 1:
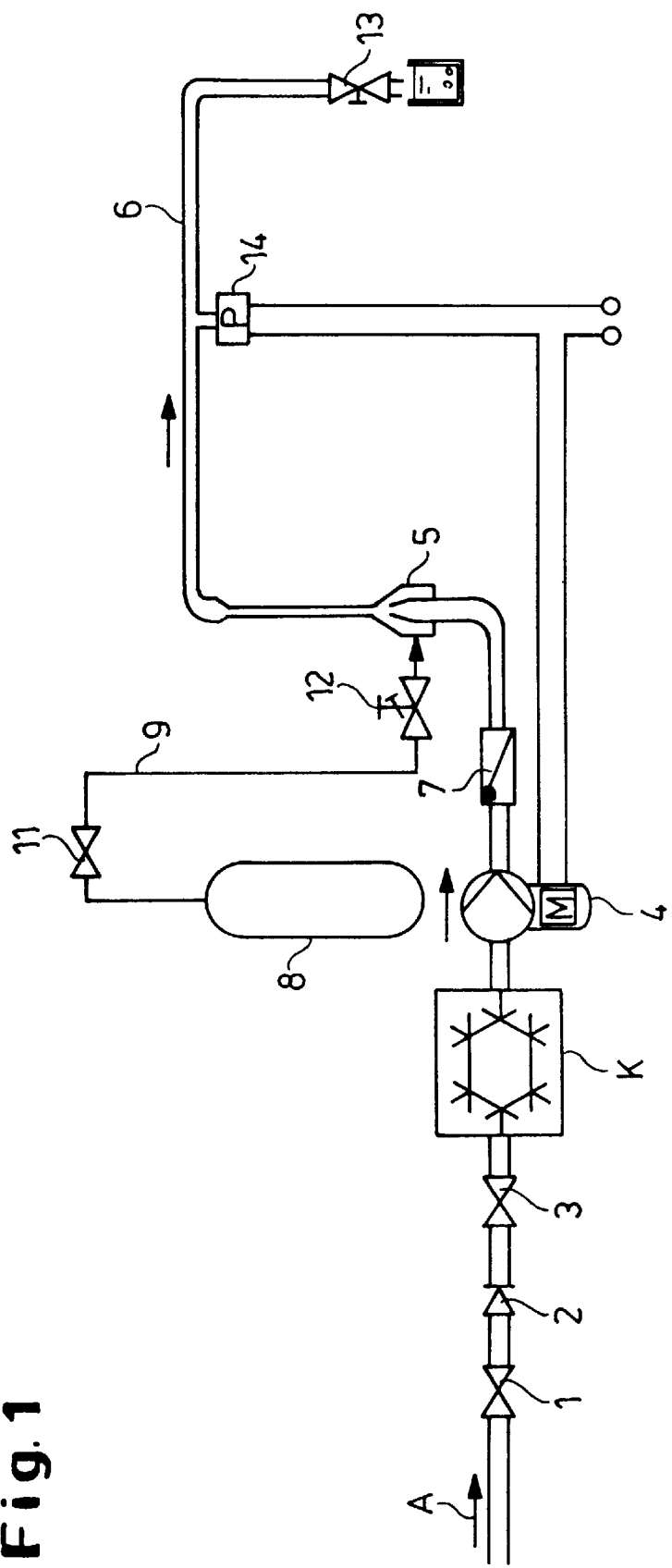
FIG. 1 is a flow diagram of the method in accordance with the invention.

As appears from FIG. 1, in this embodiment the method in accordance with the invention can essentially be divided into two basic steps, namely on the one hand the cooling and on the other hand the carbonation. The cooling stage is indicated generally in the flow diagram of FIG. 1 by K, and will be explained in more detail below with reference to FIGS. 2 and 3, since within the scope of the invention two alternatives are provided for it, namely on the one hand a compression-type cooling system (FIG. 2) and on the other hand a Peltier cooling system (FIG. 3).

Both the cooling of the drinking water and the charging of CO$_2$ into it on the end user scale aimed at by the invention take place in the continuous flow (in-line) process, and for the carbonation, within the scope of the invention, it is preferred to use the injector principle.

The drinking water is taken directly from the available supply mains through a suitable connection and supplied as shown by the arrow A through a shut-off device 1 and a non-return valve 2 to a pressure-reducing valve 3 which reduces the water pressure to a specified intake pressure, for example of 2 to 3 bar, in order to have the same starting conditions for the processing procedure independent of the pressure in the supply main, in particular so that also the pressure (range) switches operate in a trouble-free and reproducible manner. Thereafter the cooling is effected in the manner which will be described in more detail below, with the proviso that until the cooling is completed the mains pressure serves for the delivery of the drinking water to be processed.

When the cooling is complete the system pressure is raised in the transition region to the CO$_2$ charging by means of a pump 4 to an optimum pressure for the CO$_2$ charging (e.g. 7.3 to 7.5 bar).

For the gas absorption (a physical solution process) the water temperature and the CO$_2$/water system pressure are the decisive factors. The lower the water temperature and the higher the system pressure, the more CO$_2$ gas can be dissolved in the drinking water. As a further important parameter for the course of the CO$_2$ charging with time the magnitude of the CO$_2$/water contact area must be taken into consideration: the absorption time is shortened by making the contact area as large as possible.

The injector principle in accordance with the invention provides, through the increase in pressure already described, a surprisingly simple way of increasing the water velocity in the injector 5 in the vicinity of its nozzle 5a so as to create a zone of very high turbulence in the mixing tube 5b which follows and into which the injector nozzle 5a projects. An injector intake pressure of about 7 bar represents a value giving favourable results.

As the Figures show, CO$_2$ is sucked up by the injector in the transition region between the injector nozzle 5a and the mixing tube 5b, through the supply opening 5c provided in the flange of the mixing tube. Because of the intake pressure of the injector the flow velocity of the water in the injector nozzle is increased so greatly that CO$_2$ is sucked in the desired amount by the reduced pressure that results at the end of the nozzle and is delivered under conditions of great turbulence into the mixing tube, where intensive absorption of the CO$_2$ gas takes place since the two parameters—temperature and surface conditions—of the drinking water are set with the object of maximising the absorption.

In order to prevent water flowing back towards the cooling stage when the pump 4 is not operating, and the pressure in the dispensing line 6 falling, a non-return valve 7 is mounted between the pressurizing pump 4 and the injector 5.

The device in accordance with the invention can be equipped with at least one CO$_2$ storage vessel (gas bottle) 8 of ordinary commercial size, which is connected to the injector 5 by a supply line 9 which opens at 5c into the mixing tube 5b. The gas bottle 8 can be provided with a non-threaded connection device. In the line 9 there is a pressure-reducing valve 11 which lowers the pressure of the gas to, e.g., 4.5 bar working pressure for suction into the injector 5. The amount of CO$_2$ supplied to the injector can be simply adjusted by means of a flow limiter, e.g. a needle valve 12, so that the beverage dispensed can be varied almost by the glass or cupful between "still" and "sparkling": the $CO_2$ content of the water can be adjusted to be between 0 and about 6 g/l.

At the end of the dispensing line is the tap or faucet 13 which serves to control the glass or cupwise dispensing of the cooled, $CO_2$-containing drinking water. In the dispensing line 6 there is a pressure switch 14. As soon as the tap is opened, the pressure in the dispensing line 6 falls. If it falls below a predetermined pressure of, for example, 4.5 bar, the pressure switch 14 switches on the pressurizing pump 4 so that the pressure required for the desired turbulence in the injector is maintained. After closure of the tap 13 at the end of the withdrawal the pump 4 continues to deliver until on reaching the predetermined upper pressure of for example about 5.5 bar the pressure switch 14 switches the pump 4 off again. In this way a minimum pressure (in this case 4 bar) is always maintained and demixing of $CO_2$ and water is suppressed.

To help ensure uniform withdrawal with the same water quality a compensator can be fitted on or integrated in the tap 13 as a back pressure controlling the pressure in a way that the mixing process is optimized.

Figure 2:
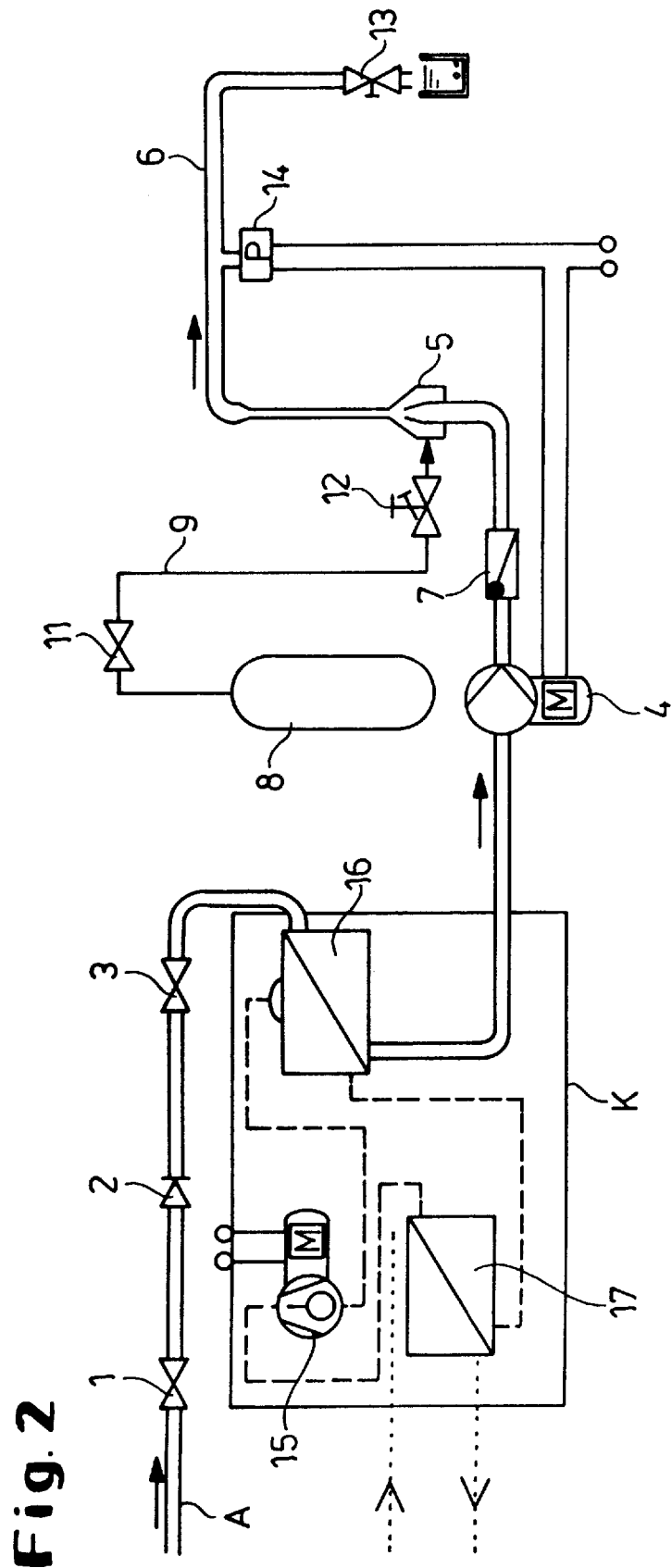
FIG. 2 shows the flow diagram of FIG. 1 with compression type cooling.
Figure 3:
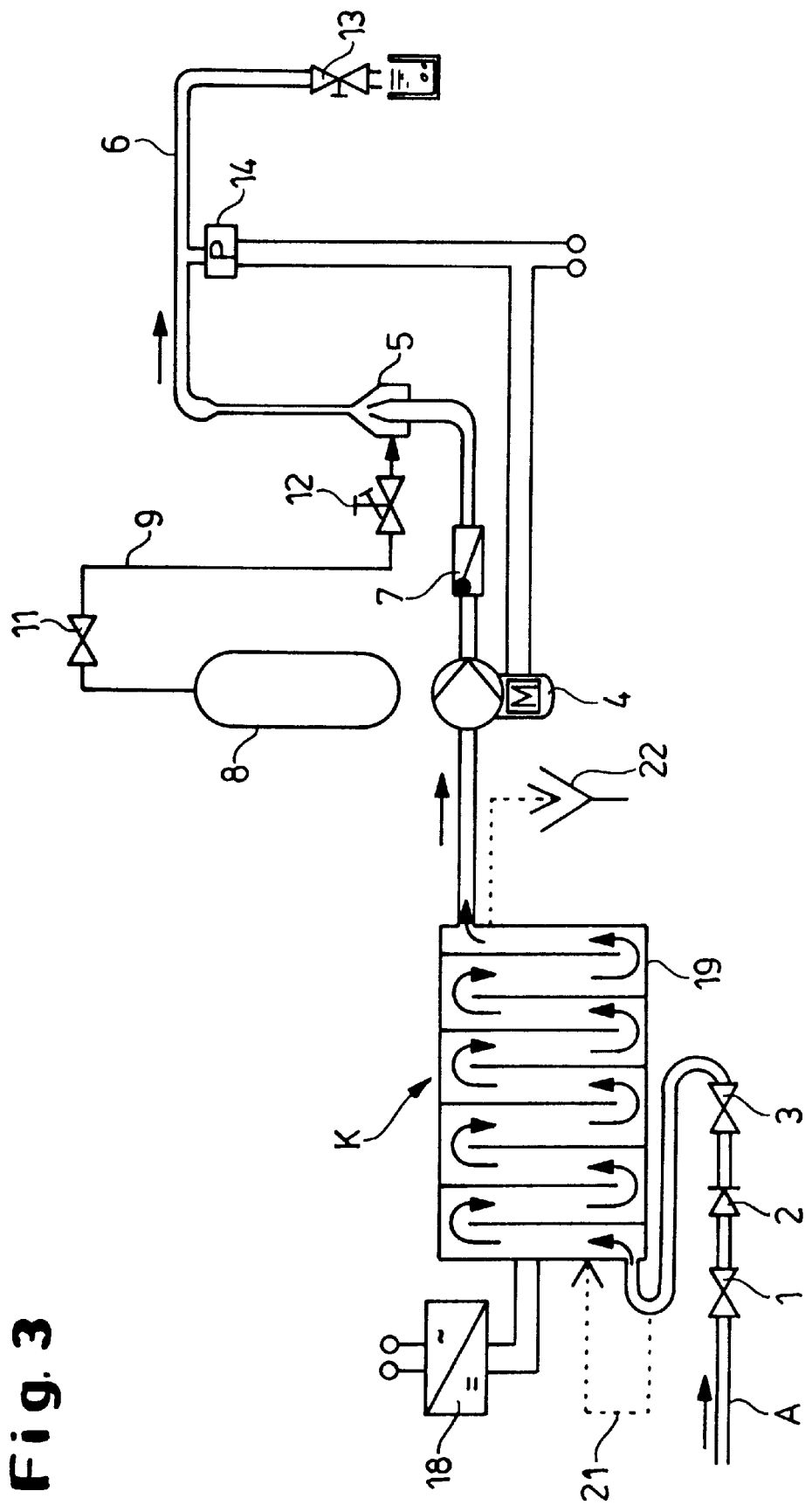
FIG. 3 shows the flow diagram of FIG. 1 with Peltier cooling.

In FIG. 2 the flow diagram for a device in accordance with the invention with a compression cooling system K is shown, all the other parts being laid out as shown in FIG. 1, so that they need not be explained again. The compression cooling system operates in known manner, namely with air recooling, 15 denoting the compressor, 16 the evaporator and 17 the condenser.

The Peltier cooling system K which can alternatively be used is shown in FIG. 3, the other parts again being provided as already explained in connection with FIG. 1. The fundamental design of the Peltier cooling system is known. A mains appliance 18 supplies the Peltier elements, which are attached to a metal block with staggered cooling ribs or fins which is accommodated in a drinking water through-flow housing 19. For the recooling of the Peltier elements part of the drinking water coming from the mains is diverted as a stream 21 which after flowing through the cooling plates ends up in a drain 22. Incidentally, the flowing stream 21 of part of the drinking water to be processed, used as cooling water, provides an advantageous way of overcoming the problem of stagnation is advantageously overcome, since as a result the drinking water does not remain completely stationary in the supply pipe.

Figure 4:
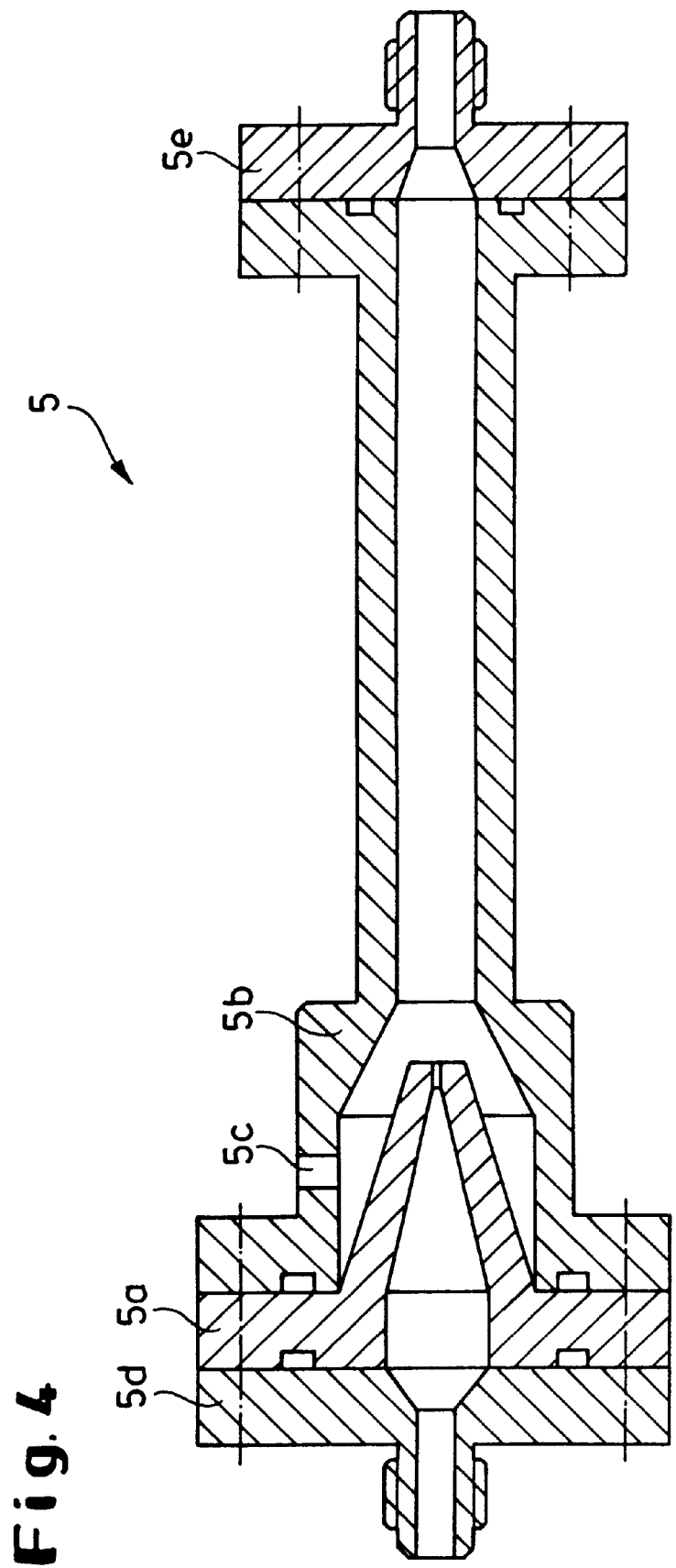
FIG. 4 shows an injector in accordance with the invention.

The possible form of an injector 5 shown in FIG. 4, consisting of the injector nozzle 5a which projects into the mixing tube 5b, into which $CO_2$ is sucked at 5c and in which the $CO_2$ is then mixed with the drinking water which is highly accelerated in the injector nozzle, has a high pressure end flange 5d screwed to it at the intake end and a low pressure end flange 5e screwed to it at the outflow end, resulting in an easy-to-mount component which can be inserted at any desired position in the pipeline.

The invention provides an appliance which is easy for the end user to operate and which, in contrast to previous appliances, is on the one hand particularly simple to use because of the omission of separate precooling in special vessels and on the other hand guarantees constant dispensing performance in respect both of the $CO_2$ content and of the temperature of the beverage, which for the reasons previously explained is not the case with the known large-scale appliances. Furthermore by means of the invention the possibility is provided of metering the $CO_2$ content almost by the glass or cupful. This is not possible with the present appliances, since depending on the rate of withdrawal these introduce a non-constant amount of $CO_2$ into the water in a storage tank which is required there but which in the case of the invention is superfluous. The continuous in-line operation in accordance with the invention is possible without an intermediate storage vessel and consequently results in dimensions suitable for end users, and offers, through the modular construction of the cooling and $CO_2$ charging systems, possibilities of expansion of existing drinking water cooling appliances or operation of the $CO_2$ charging unit without cooling.

Furthermore modifications and extensions of various kinds are conceivable, in particular if the individual treatment stages are in the form of self-contained modules capable of being combined in various ways, so that for example several carbonating units with several taps can be connected to a single cooling unit, with the cooling and carbonation of the drinking water being possible here, too, in any desired sequence (first cooling, then carbonating or first carbonating and then cooling or carbonating during cooling, in which case the injector could be integrated within the cooling system), and with or without increase of the system pressure.

What is claimed is:

1. A method of in-line carbonation of drinking water, comprising the steps of:
   withdrawing drinking water from a drinking water supply line and, simultaneously, dispensing the drinking water at a dispense point; and
   carbonating the drinking water only during flow of the drinking water from the drinking water supply line to the dispense point, while a predetermined portion of the drinking water is being dispensed.

2. The method as claimed in claim 1 further comprising the step of cooling the drinking water as it flows from the drinking water supply line to the dispense point.

3. The method as claimed in claim 2, wherein the carbonating step follows the cooling step.

4. The method as claimed in claim 2, wherein the carbonation step precedes the cooling step.

5. The method as claimed in claim 2, wherein the carbonating step takes place simultaneously with the cooling step.

6. The method as claimed in claim 2, wherein the cooling step includes providing a compression-type cooling system for cooling the drinking water.

7. The method as claimed in claim 2, wherein the cooling step includes providing a Peltier cooling system for cooling the drinking water.

8. The method as claimed in claim 7, wherein the cooling step includes conducting a portion of the drinking water to-be-cooled in the Peltier cooling system through a bypass line as cooling water.

9. The method as claimed in claim 1, wherein the carbonating step includes charging the flowing drinking water with $CO_2$ using an injection principle.

10. The method as claimed in claim 9, wherein the carbonating step includes providing injection means for charging the drinking water with $CO_2$, and passing the drinking water through the injection means at an increased velocity whereby $CO_2$ is aspirated by the passing drinking water, with $CO_2$ being absorbed by the drinking water in a mixing section of a conduit, which communicates the drinking water supply line with the dispense point and is located downstream of the injection means, under turbulence conditions.

11. The method as claimed in claim 1, wherein the withdrawing and dispensing step includes flowing the drinking water at least through a portion of a conduit, which communicates the drinking water supply line with the dispense point, under a pressure corresponding to a pressure of the drinking water in the drinking water supply line.

12. The method as claimed in claim 1, wherein the withdrawing and dispensing step includes flowing the drinking water at least through a portion of a conduit, which communicates the drinking water supply line with the dispense point, under a pressure which exceeds the pressure of the drinking water in the drinking water supply line.

13. The method as claimed in claim 12, further comprising the step of cooling the drinking water as it flows from the drinking water supply line to the dispense point, and wherein the withdrawing and dispensing step includes increasing the pressure of the drinking water above the pressure of the drinking water in the drinking water supply line after at least one of cooling of the drinking water and carbonation of the drinking water.

14. The method as claimed in claim 12, further comprising the step of cooling the drinking water as it flows from the drinking water supply line to the dispense point, and wherein the withdrawing and dispensing step includes increasing the pressure of the drinking water above the pressure of the drinking water in the drinking water supply line after cooling of the drinking water and before carbonation of the drinking water.

15. The method as claimed in claim 12, further comprising the step of cooling the drinking water as it flows from the drinking water supply line to the dispense point, and wherein the withdrawing and dispensing step includes increasing the pressure of the drinking water above the pressure of the drinking water in the drinking water supply line before cooling of the drinking water and after carbonation of the drinking water.

16. The method as claimed in claim 1, wherein the carbonating step includes discharging a variable amount of $CO_2$, in accordance with a desired carbonation of the drinking water at the dispense point.

17. The method as claimed in claim 1, comprising the step of increasing a velocity of the drinking water in a carbonation region of a conduit connecting the drinking water supply line with the dispense point.

18. The method as claimed in claim 1, comprising the step of stabilizing the drinking water after the drinking water has been carbonated.

19. The method as claimed in claim 1, comprising the step of controlling pressure of the drinking water in accordance with drinking water take-off conditions at the dispense point.

20. A device for carbonation of drinking water in a continuous in-line processing, the device comprising at least one carbonation section for connection to a drinking water supply line; a dispensing line arranged downstream of the at least one carbonation section; and means provided in the carbonation section for carbonating the drinking water and designed for carbonation of the drinking water only during flow of the drinking water from the drinking water supply line toward a dispense point.

21. The device as claimed in claim 20, further comprising a system for cooling the drinking water and located upstream of the dispense point.

22. The device as claimed in claim 21, wherein the cooling system is arranged upstream of the carbonation section.

23. The device as claimed in claim 22, wherein the cooling system is a compression cooling system.

24. The device as claimed in claim 22, wherein the cooling system is a Peltier cooling system.

25. The device as claimed in claim 20, wherein the carbonation section comprises an injector connected with a source of $CO_2$.

26. The device as claimed in claim 25, further comprising a system for cooling the drinking water and located upstream of the injector.

27. The device as claimed in claim 25, wherein the carbonation section comprises a mixing tube, in which the drinking water is mixed with $CO_2$, and the injector comprises a nozzle having a low pressure end thereof projecting into the mixing tube.

28. The device as claimed in claim 27, further comprising means for controlling supply of $CO_2$ into the mixing tube.

29. The device as claimed in claim 28, wherein the controlling means comprises a flow quantity control valve for controlling the supply of $CO_2$ from the $CO_2$ source.

30. The device as claimed in claim 20, further comprising a pump for pressurizing the drinking water which flows from the drinking water supply line to the dispense point.

31. The device as claimed in claim 30, wherein the pressurizing pump is located upstream of the carbonation section.

32. The device as claimed in claim 31, wherein the carbonation section comprises a pressure monitor.

33. The device as claimed in claim 32, wherein the pressure monitor is operatively connected with the pressurizing pump for switching same on and off dependent on withdrawal of the drinking water at the dispense point.

34. The device as claimed in claim 31, further comprising a non-return valve located between the pressurizing pump and the injector.

35. The device as claimed in claim 20, wherein the carbonation section forms part of the dispensing line.

36. The device as claimed in claim 20, farther comprising a compensator for controlling pressure of the drinking water and provided at the dispensing point for optimizing mixing of $CO_2$ with the drinking water.

37. The device as claimed in claim 20, further comprising non-threaded connection means for connecting the device with a $CO_2$ source.

38. The device as claimed in claim 20, wherein the device is formed as a portable unit.

39. The device as claimed in claim 20, wherein the device is formed as a modular construction.

40. The device as claimed in claim 39, comprising a plurality of $CO_2$ supply modules.

41. The device as claimed in claim 40, comprising a drinking water cooling system formed as a cooling module.

42. The device as claimed in claim 41, wherein the plurality of $CO_2$ supply modules comprises at least two modules simultaneously connected to the cooling module.

43. The device as claimed in claim 39, comprising a plurality of tapping valves at the dispense point for enabling withdrawal of drinking water at several points.

* * * * *